May 9, 1950  R. C. MERCER  2,506,933
MEANS FOR PATCHING MOTION-PICTURE FILM
Filed April 27, 1945
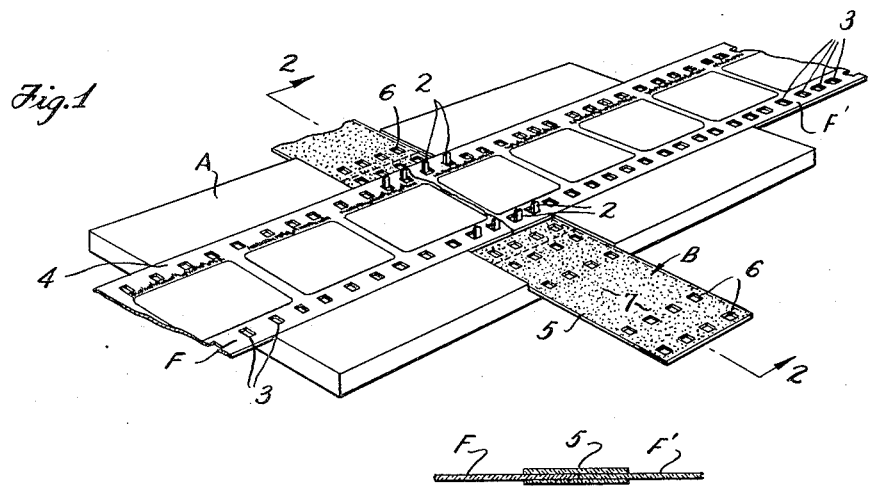
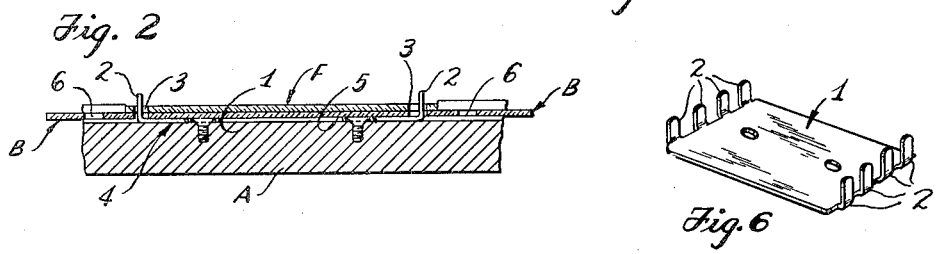
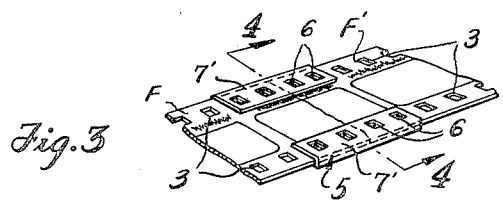
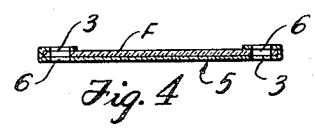
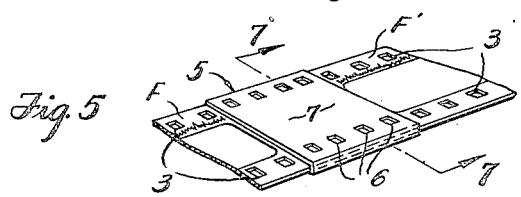
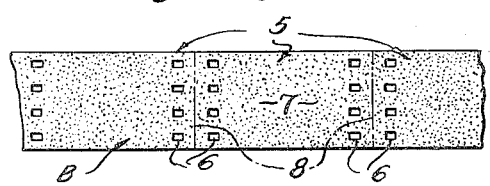
INVENTOR.
RAYMOND C. MERCER
BY
attorney Patented May 9, 1950

2,506,933

UNITED STATES PATENT OFFICE 2,506,933

MEANS FOR PATCHING MOTION-PICTURE FILM

Raymond C. Mercer, Los Angeles, Calif.

Application April 27, 1945, Serial No. 590,625

1 Claim. (Cl. 88—19.5)

1

This invention relates to film patches somewhat similar to patches disclosed in Letters Patent of the United States granted to me on August 30, 1921, and numbered 1,389,523, and also Letters Patent of the United States granted to me on July 20, 1937, numbered 2,087,289.

My prior patches have been made of opaque material and generally of metal with marginal teeth insertible through the sprocket perforations of a motion picture film so that overlapping or abutting sections of a broken film may be held together when the teeth of the patches are bent over the film sections.

It is an object of the present invention to provide a transparent adhesive patch applicable over abutting portions of broken or cut sections of film and having perforations adapted to register with the perforations on the film so that emergency repair to a film may be quickly made during the projection of a picture without occasioning the omission of even a single frame of the film.

An object, also, is to provide a series of adhesive film patches arranged in a roll of tape, with perforations between adjacent sections or at least adapted to be cut or separated on uniformly spaced transverse lines, and in which sections transverse rows of perforations are provided for registration with the film perforations when the patch sections are applied to parted sections of a film.

A further object is to provide a tape-like adhesive and perforated strip of transparent, flexible material, preferably in a roll for application of portions thereof to a motion picture film, a suitable support for the film sections to be patched, and a suitable registering device carried by the support and provided with teeth, pins or other elements adapted to engage the sprocket perforations of the film sections for holding the ends of the film sections in abutting position, and also for holding a section of the patching material in patching position with the tacky side of the tape adjacent the film sections, whereby the adhesive patches may be accurately affixed to the upper and lower sides of the film sections.

Other and more detailed objects may appear as the description of my invention progresses.

I have shown a preferred form of my improvements with minor modifications in the accompanying drawings, subject to still further change, within the scope of the appended claim, without departing from the spirit of my invention.

In said drawings:

Fig. 1 is a perspective view of two sections of film disposed on a suitable support relative to an adhesive strip of patching material to making a patch;

Fig. 2 is a transverse section on line 2—2 of Fig. 1;

Fig. 3 is a fragmentary view in perspective of one form of completed patch;

Fig. 4 is a transverse section on line 4—4 of Fig. 3;

Fig. 5 is a fragmentary view in perspective of a modified form of patch;

Fig. 6 is a perspective view of a type of metal patch disclosed in my said patent which is useful in the present invention for affording accurate registration of the film sections and the patches embodying the herein disclosed novel features;

Fig. 7 is a section on line 7—7 of Fig. 5;

Fig. 8 is a fragmentary view of the adhesive side of a strip of tape adapted for use in this type of patching means; and Fig. 9 is a fragmentary longitudinal section showing the separated sections in abutting relation with the patch applied thereover.

Briefly, with reference to the drawing, this invention comprehends the provision of a new method and means for joining the torn or cut ends of sections of motion picture films as at F and F' which, due to accident or otherwise have become separated, as when a picture is being projected upon a screen. Usually, under such circumstances, any available means is employed for reconnecting the separated film sections, but frequently a patch of the character shown in Fig. 6 of my invention, is used which embodies a flat body 1 adapted to underlie abutting portions of film sections F and F' and has teeth 2, 2, etc., at opposite ends thereof adapted to extend through sprocket perforations 3, 3, etc., of said films, and are bent over the surface of the films opposite body 1 of the patch.

The patch 1, however, is usually opaque, or at most but slightly of light transmitting quality, and requires an overlapping of the films, thereby obliterating the effect of at least two frames or picture areas on the films, and, correspondingly, impairing the continuity of the picture momentarily.

I, therefore, provide a suitable support A of generally flat cross section formed with a very shallow groove 4, which corresponds in width to the films F and F' and has transversely supported therein one of the metal patches 1 shown in Fig. 6 with the teeth 2 thereof upstanding so that the parted sections of the film may be positioned thereon with their adjacent ends held against displacement by said teeth.

Prior to positioning the films on the patch 1, however, a section 5 of an adhesive tape B is pulled from a roll (not shown) and laid with its tacky surface uppermost upon the body 1 of the metal patch. Each section 5 of the patching tape may have perforations 6 pre-formed therein in accurately spaced relationship with the perforations 3 of the films and the teeth 2 of the metal patch 1; or, if the tape is of a material capable of being readily perforated or punched, any suitable means may be employed for applying the adhesive tape over the end portions of the films and for perforating the patches so that there will be provided adequate sprocket perforations during the movement of a film through a projector.

As shown in Fig. 3 each tape section 5 is formed with two parallel rows of perforations 6 near each extremity so that when the main portion 7 of each section underlies the two film end portions, the end portions 7' of the sections will overlie marginal portions of said films, and thus leave the picture and sound areas of the films uncovered on one side of the films.

As shown in Fig. 8 tape B's two adjacent sections 5 may be employed for each patch (see also Fig. 5) wherein one section would underlie and another section would overlie the films F and F', and still other forms of tape may be provided if desired. It is preferable to preperforate the tape B, as at 8, so as to subdivide the tape into accurately measured sections of the same length.

Of course it is apparent that the sections 5 of transparent adhesive material may be made in pads, as well as in the form of a continuous tape with perforated lines of division between adjacent sections.

I claim:

A patch of transparent material for joining sections of motion picture films and having a surface thereof coated with adhesive material, characterized by a length sufficiently in excess of the width of the film to be patched to extend across one face only of the film and both faces of the longitudinal perforated edges of the film, and of a width sufficient to extend over at least one edge perforation at each side of both abutting ends and being provided with four parallel rows of perforations, the distance between the inner rows of perforations corresponding to the distance between the two rows of perforations of the film whereas each of the outer rows of perforations of the strip is spaced a distance from the adjacent inner row of perforations of the strip such that the outer rows of perforations of the strip are in alignment with the rows of perforations of the film when the parts of the patch projecting beyond the edges of the film are folded around said edges of the film and laid flat upon the face of the film edges opposite to the strip of patching material.

RAYMOND C. MERCER.

REFERENCES CITED

The following references are of record in the file of this patent:

UNITED STATES PATENTS

| Number | Name | Date |
| --- | --- | --- |
| 1,310,215 | Schneider | July 15, 1919 |
| 1,535,129 | Monacelli et al. | Apr. 28, 1925 |
| 1,591,500 | Tessier | July 6, 1926 |
| 1,921,954 | Stewart | Aug. 8, 1933 |
| 1,921,963 | Crabtree | Aug. 8, 1933 |
| 2,099,439 | Goldhammer | Nov. 16, 1937 |
| 2,318,287 | Brolin | May 4, 1943 |
| 2,346,874 | Russell | Apr. 18, 1944 |
| 2,348,237 | Barr et al. | May 9, 1944 |